Patented Feb. 1, 1949

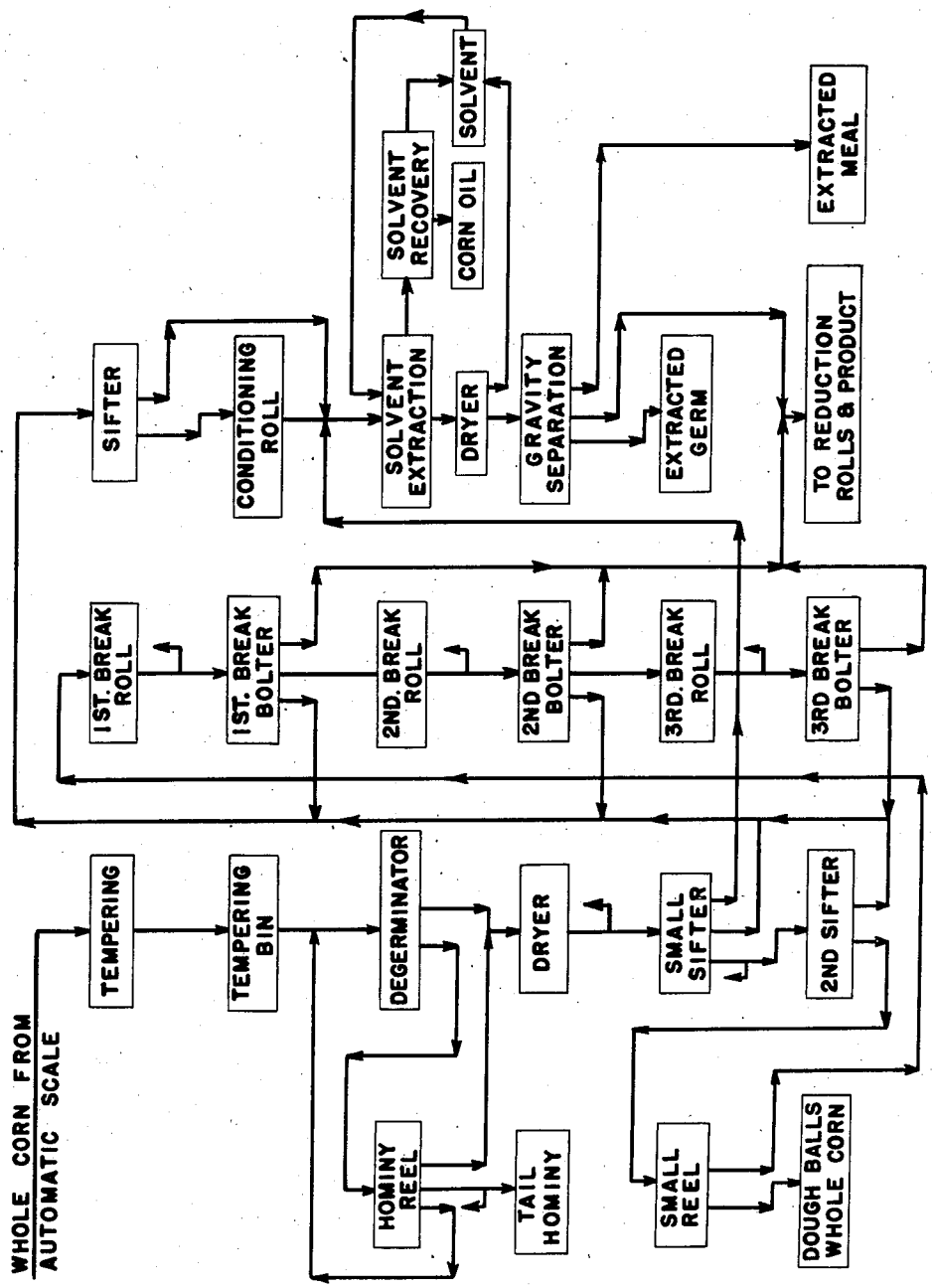

2,460,389

UNITED STATES PATENT OFFICE 2,460,389

SOLVENT EXTRACTION AS STEP IN MILLING PROCESS

William R. Lloyd and Glen H. Schafer, Chicago, Ill., assignors, by mesne assignments, to Charles A. Krause, Jr., Milwaukee, Wis.

Application March 29, 1945, Serial No. 585,546

5 Claims. (Cl. 99—80)

This invention relates to the milling of corn to produce high yields of corn oil, high yields of low oil content corn grits or endosperm, low oil content corn germ, and some by-products which have important commercial uses because of their low oil contents.

Specifically this invention relates to the dry milling of corn wherein the corn oil is extracted from mixed corn germ and endosperm, and wherein the oil-freed mixture is then separated to produce low oil content substantially pure corn grits and corn germ fractions.

Heretofore, in the dry milling of corn, the whole corn kernels have been tempered or steeped, mechanically torn in a degerminator to loosen the hulls, germ and endosperm, dried, and sifted to produce fine, medium, and coarse fractions. The particles of the fine fraction were too small to be further separated into their various components, so this fraction was rejected from the milling process and sold as an animal feed. It contained a high percentage of germ and corn oil, thereby representing a large loss of oil from the process and producing an animal feed wherein oil content is undesirable. For example, a high corn oil content hog feed has been found to produce "soft" pork. The other fractions were milled on a large series of break rolls and germ rolls, the break rolls serving to crack the grits and the germ rolls serving to flatten out the germ particles and further reduce the grits. The products from the break rolls and germ rolls were divided into fractions by means of bolters or the like screens to eventually produce a product composed mainly of the germ and corn oil, and a second product composed mainly of the endosperm or corn grits. The corn oil containing germ product was subjected to a pressure filtering operation which produced a press cake and corn oil. The corn oil containing germ product, prior to the oil pressing treatment, contained about 23 to 25% of corn oil. The pressing operation yielded a press cake containing about 6 to 7% of corn oil. This press cake had a very bitter taste, due to high temperatures generated during the pressing operation. The product was not suitable for human consumption and was admixed with the fine fraction from the sifters to form a low grade animal food.

The corn grits or endosperm product obtained from the break roll and germ roll bolters contained about 2 to 2½% corn oil since complete separation of the germ from the endosperm on the germ rolls is not obtained and furthermore the squeezing of the germ on the germ rolls expells some oil into the endosperm.

The oil content of the endosperm is very important especially when the endosperm or corn grits are used for brewing purposes. Corn oil interferes with the yeast growth in brewing, lessens the stability of the beer foam, and renders the bear cloudy.

Since corn oil commands a comparatively high price, and since the presence of the oil both in the milled germ and in the endosperm is highly objectionable, the present invention provides a dry milling process which not only produces a higher yield of corn oil but also increases the yields of corn grits or endosperm and germ. The grits and germ have very low oil contents. By-products composed of fines, aspirations, and bran likewise have a very low oil content thereby forming excellent animal feed. These by-products will contain not more than about 4% of oil whereas heretofore the by-products from a dry milling process had an oil content averaging 6%. The low oil content animal feed produces firm pork, is exceptionally stable, and is produced in lesser amounts than the by-products produced by heretofore known dry milling processes.

In accordance with this invention the heretofore required germ rolls, germ bolts, and oil expellers or presses are replaced with a solvent extraction unit. Solvents such as hydrocarbons, chlorinated hydrocarbons, alcohols and the like are useful. Hexane is a highly desirable solvent for extraction of corn oil. The use of a solvent extraction unit in place of the germ rolls makes possible the extraction of the fines from the dried sifted degerminated product, which fines were heretofore removed from the process and sold as a low grade animal feed containing 6 to 7% of oil. The use of the solvent extraction unit also has made possible an efficient gravity separation of germ and endosperm since the germ particles in the extracted product are oil free and have a much lower apparent density than the oil-laden germ product. Gravity separation of the endosperm from the oil-freed germ particles is very efficient. This efficient separtion produces a substantially pure germ product, a substantially pure endosperm product, and a very low oil content meal product.

It is, then, an object of this invention to enhance the efficiency of the dry milling of corn for producing high yields of corn oil, and substantially pure germ and endosperm products.

Another object of the invention is to utilize solvent extraction, in a dry corn milling process, before the corn germ is separated from the endosperm.

A still further object of the invention is to provide a dry corn milling process wherein the separation of corn germ and endosperm is finished after the mixed materials have been subjected to solvent extraction.

A still further object of the invention is to eliminate heretofore required germ rolls, sifters, bolters and expellers in the dry milling of corn by the use of solvent extraction apparatus.

Another object of the invention is to produce low corn oil content by-products in the dry milling of corn without producing other by-products.

A still further object of the invention is to provide a corn milling process which only results in the production of corn oil, low oil content corn germ fit for human consumption, low oil content corn grits adapted to bring a premium price for brewing purposes, a very low oil content extracted meal adapted to bring a premium price, and smaller amounts of aspirations than were heretofore produced.

Other objects and features of the invention will be apparent to those skilled in the art from the following descriptions and the flow diagram on the attached sheet of drawings which illustrates the process of this invention.

As shown on the drawing, whole corn kernels are fed from an automatic scale into a tempering or steeping vat where they are humidified to about a 22% moisture content. The moistened kernels are then held in a tempering bin for about an hour. The exact moisture content and time in the tempering bin depend upon the condition of the corn as it is received at the mill.

From the tempering bin, the corn goes to a degerminator where the hulls are loosened and germ is mechanically torn from the remainder of the kernel. This mechanically tearing degerminating operation is far from perfect, and much of the corn grits or endosperm are broken up at the same time. Most of the remaining milling operations are devoted to the separation of the germ from the smaller pieces of broken endosperm. The larger pieces of endosperm are more easily separated from the germ, the first step of this separation taking place in the degerminator itself on a perforated plate which passes the germ mixed with about 65 to 70% of the total endosperm to form a "through" stream. The material which does not pass through the perforated plate forms the first "side" stream which is composed of the larger pieces of endosperm, germ, and whole corn kernels that were not broken up on the degerminator. The first side stream is passed into a hominy reel which separates the stream into fine, medium, and coarse fractions. The coarse fraction is returned to the degerminator for further mechanical tearing operations. The fine fraction of the first side stream is combined with the through stream. A grit product composed mainly of endosperm and about .8% corn oil is recovered from the medium fraction. This grit material is called "tail hominy" and is useful as a finished grit product in the industry. It is not further treated in accordance with this process.

The combined through stream from the hominy reel and the degerminator is passed through a drier where its moisture content is reduced to about 16 to 17%. The material at this point of the process represents about 70% of the original charge and contains about 5 to 6% of oil depending on the oil content of the whole corn kernel.

The dried through stream next passes to a small sifter or reel where it is separated to form a second side stream composed of the coarse particles, a sifted through stream composed of the medium particles, and a solvent extraction stream composed of the fines. Heretofore these fines were considered to be composed of such minute particles that they could not be further processed for germ and endosperm separation. Accordingly they were removed from the process to provide a low grade animal feed called "niggermeal." The "niggermeal" contained about 7 to 8% corn oil which was lost to the process.

The coarse particles, which contain about 4 to 4½% corn oil in the second side stream are fed to a second sifter for further separation into coarse and fine fractions. The coarse fraction is passed through a small reel which removes "dough-balls" and trash which may have gotten into the stream. These dough-balls consist of dirt, fines from the degerminator, and the like materials which, due to their high moisture content, have stuck together into balls. The dough-balls and trash are removed at this point but the loss from the process is relatively insignificant. The operation is necessary, however, to clean up the stream to the break rolls as hereinafter specified.

The material in the second side stream which passes through the small reel is fed to the first break roll.

The medium fraction from the small sifter, and the fine fraction from the second sifter are combined to form the through stream to another sifter having an 8-mesh screen to separate particles which are too large for solvent extraction. The material which passes through the 8-mesh screen is combined with the solvent extraction stream. The material retained on the 8-mesh screen is passed through a "conditioning roll" for reducing the size of the endosperm and for flattening the germ particles. This conditioning roll is composed of a pair of corrugated rolls running at different speeds and receiving the coarse particles from the sifter through the nip thereof.

The material which passes through the small reel in the second side stream is fed to the first break roll of a series of three break roll assemblies. Each break roll assembly is composed of a pair of corrugated rollers receiving the material through the nip thereof. These rollers run at different speeds and have a shearing action on the grits to crack the grits and to flatten the germ particles. One of the two rolls of each break roll assembly is preferably run about 2½ times as fast as the other roll. The corrugations of the roll are arranged spirally around the roll to create the shearing action on the grits.

The stream from the first break roll assembly is passed into a first break bolter which separates the product into a coarse fraction, a medium fraction, and a fine fraction. The coarse fraction is combined with the through stream to the sifter for the conditioning roll, the medium fraction is fed to a second break roll assembly, and the fine fraction is fed to the finished product bin.

The second break roll assembly further cracks the grits and flattens the endosperm, and the product passing therethrough is fed to a second break bolter which, like the first break bolter, separates the stream into a fine, medium, and coarse fraction. The coarse fraction is fed to the through stream to the sifter for the conditioning roll, the medium fraction is fed to a third break roll assembly, and the fine fraction is fed to the finished product bin.

The third break roll assembly further cracks the grits and flattens the germ to feed a product to the third break bolter which provides a coarse fraction fed to the through stream, and a fine fraction fed to the finished product bin.

The combined solvent extraction streams from the smaller sifter, the conditioning roll sifter, and the conditioning roll, is fed through a solvent extraction unit. In this unit, countercurrent streams of hexane and the mixed germ and endosperm are created for the efficient extraction of oil from the solids. The oil-freed solids are then dried. The oil containing solvent is passed through a solvent recovery unit which separates the solvent from the corn oil.

The dried solid products composed of oil freed endosperm and germ are next subjected to a gravity separation treatment which creates a substantially pure extracted germ fraction, a substantially pure endosperm fraction, and a fine extracted meal fraction. Each of these fractions has a low oil content of 1% or less. The gravity separation can be effected on a shake table wherein air jets aid the movement of particles of different gravities to different parts of the table from which they are collected.

The extracted oil freed germ particles have a substantially lessened apparent density than the oil-laden germ particles in the mixture before the solvent extraction treatment. This decreased apparent density materially increases the efficiency of the gravity separation since the oil freed germ particles will have a widely different density than the oil freed endosperm particles.

While gravity separation is desirable, other types of separation processes can be used such as germ roll reduction and sifting methods commonly applied in the industry before removal of oil from the germ and grits.

The corn streams are subjected to aspiration treatments at several points in the process to remove bran, chaff, fines, and the like. These aspiration treatments are indicated by the upwardly pointing individual arrow heads on the flow sheet between the hominy reel and the tail hominy product bin, between the drier and small sifter, between the small sifter and second sifter, and between each break roll and its bolter. The aspiration products contain only about 3% germ oil, more bran and less germ and endosperm to provide a much higher grade animal feed than was heretofore produced. Further, since the germ roll treatments of the prior dry corn milling processes are eliminated by this invention, the amount of aspiration products is decreased. These smaller amounts of aspiration products, however, form a much more valuable animal feed by-product than the by-products of prior dry milling processes because of its relatively low oil content.

The cost of operating the solvent recovery unit in the process of this invention is less than the cost of operating the heretofore required germ rolls and oil expellers. Since the solvent extraction unit produces higher yields of germ oil and lower oil content in the germ and endosperm products, it will be appreciated that this invention is of tremendous importance to the milling industry.

From the above descriptions it should be understood that the dry corn milling process of this invention produces but six products, as follows:

1. Tail hominy.
2. Corn oil.
3. Extracted germ.
4. Endosperm.
5. Extracted meal.
6. Bran and fines aspirations.

The extracted germ is so low in oil content (1% or less) that it forms a valuable human food such as a breakfast cereal. This germ product is a nutritionally complete protein supplement for human diets. The endosperm also has a very low oil content (1% or less) and is a high grade, pure product. This endosperm product, produced by gravity separation, has a larger percentage of large grits than the product obtained from germ roll separation. High yields of large grits are desirable in marketing corn grits. The extracted meal and the other aspirations products likewise have much lower oil contents than heretofore known dry milling by-products and produce excellent animal feed.

It will, of course, be understood that various details of the process and product may be varied through a wide range without departing from the principles of this invention and it is, therefore, not the purpose to limit the patent granted hereon otherwise than necessitated by the scope of the appended claims.

We claim as our invention:

1. The process of milling corn which comprises tempering corn kernels in a humid atmosphere, mechanically tearing the tempered kernels to loosen the germ from the endosperm, coarse screening the torn kernels to form a first side stream composed of the larger pieces of endosperm, germ, and whole corn kernels and a through stream composed of germ and finer particles of endosperm, reeling the first side stream to separate fine, medium and coarse fractions, returning the coarse fraction for further mechanical tearing, combining the fine fraction with the through stream, recovering a grit product from the medium fraction, drying the through stream, sifting the dried through stream to form a second side stream composed of the coarser particles, a sifted through stream composed of the medium particles, and a solvent extraction stream composed of the fine particles, further sifting the second side stream into coarse and fines fractions, combining the fines fraction with the sifted through stream, reeling the coarse fraction to separate doughballs therefrom, rolling the reeled coarse fraction to further crack the endosperm and flatten the germ particles, bolting the cracked products thus formed into fine, medium and coarse fractions, rolling the bolted medium fraction, bolting the products from the last rolling operation into coarse and fines fractions, combining the bolted coarse fractions with the through stream, recovering the fines from all of the bolted fractions to form an endosperm product, sifting the through stream into coarse and fines fractions, rolling the coarse fraction to reduce the size of the endosperm particles and to further flatten the germ particles, combining the conditioned product and the sifted fines fractions with the solvent extraction stream, solvent extracting the oil from the concentrated mixture of germ and endosperm in said solvent extraction stream, separating corn oil from the solvent, drying the extracted solids, and gravity separating the dried extracted solids into an extracted meal fraction, an endosperm fraction, and a germ fraction.

2. In the method of dry milling corn, the steps which comprise sifting a dried stream of torn corn kernels into fine, medium and coarse fractions, successively milling the coarse fraction to crack the endosperm and flatten the germ particles, bolting the product from the milling operation into coarse and fines fractions, combining the sifted medium fraction with the bolted coarse fraction, sifting said combined fractions into coarse and fines sub-fractions, rolling the coarse sub-fraction to further crack the endosperm and flatten the germ particles, combining the product from the rolling operation with the fines sub-fraction, solvent extracting said last mentioned combined fraction with the fines fraction from the first mentioned sifting operation, recovering corn oil from the solvent extraction treatment, gravity separating the solids from the solvent extraction into an extracted germ fraction, an endosperm fraction, and an extracted meal fraction, and combining the bolted fines with the endosperm fraction.

3. In the method of dry milling corn, the steps which comprise degerminating corn kernels to form a coarse mixture of corn germ and corn endosperm particles, milling said mixture to separate some of the endosperm therefrom, collecting the separated endosperm, solvent extracting corn oil from the remaining germ-rich endosperm mixture, gravity separating the extracted solids into an extracted germ fraction and an extracted endosperm fraction, and combining the extracted endosperm with the collected separated endosperm to provide a high grade endosperm product low in oil content.

4. The process of milling corn which comprises degerminating corn kernels, drying the degerminated kernels, sifting the dried material into coarse, fine and medium fractions, subjecting the dried material to an aspiration treatment for removing bran and chaff therefrom, milling the coarse fraction to separate endosperm therefrom and form a germ-rich material, combining the germ-rich material with the medium fraction, reducing the size of the coarse particles in the combined product, and solvent extracting the combined product with the fines fraction.

5. In the process of dry milling corn, the steps which comprise rolling corn particles to crack the particles and flatten the germ portions thereof, separating endosperm from the product of the rolling operation, separating bran and chaff from said product, solvent extracting the germ-rich endosperm material remaining after the bran, chaff and endosperm have been separated therefrom to remove the corn oil, and then separating the extracted solids to form an extracted germ product and an extracted endosperm product.

WILLIAM R. LLOYD.
GLEN H. SCHAFER.

REFERENCES CITED

The following references are of record in the file of this patent:

UNITED STATES PATENTS

| Number | Name | Date |
|---|---|---|
| Re. 22,748 | Levin | Apr. 30, 1946 |
| 2,253,696 | Fauth | Aug. 26, 1941 |
| 2,314,282 | Levin | Mar. 16, 1943 |
| 2,344,229 | Block et al. | Mar. 14, 1944 |

FOREIGN PATENTS

| Number | Country | Date |
|---|---|---|
| 10,390 | Great Britain | Aug. 13, 1886 |

OTHER REFERENCES

"Consolidated Grain Millers Catalogue," ed. No. 6, page 432.

"Modern Corn Milling," Food Industries, Sept. 1939, pages 360, 361, 362.